United States Patent Office 3,057,156
Patented Oct. 9, 1962

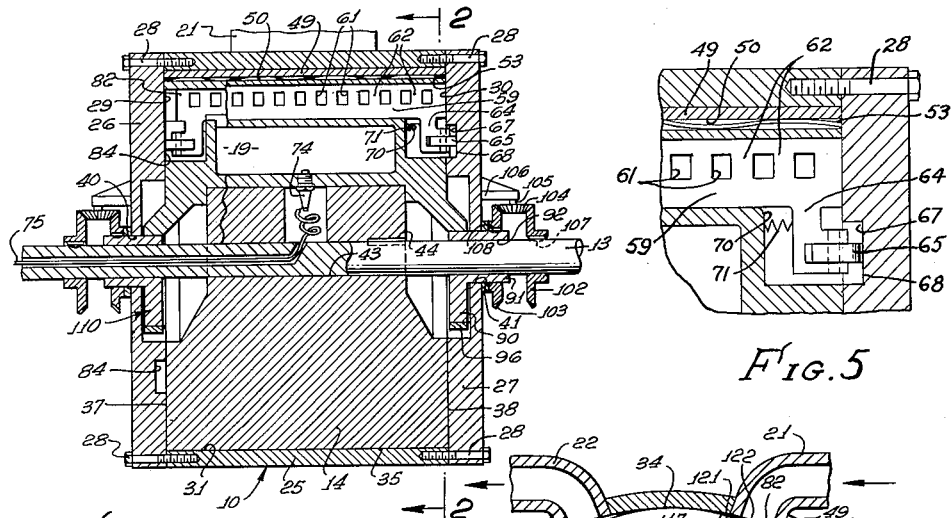
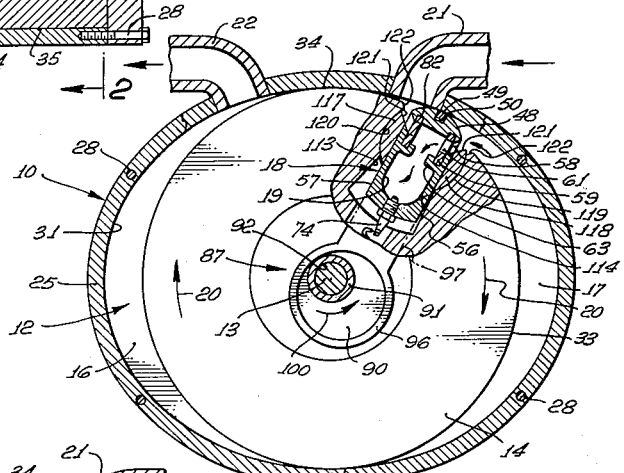
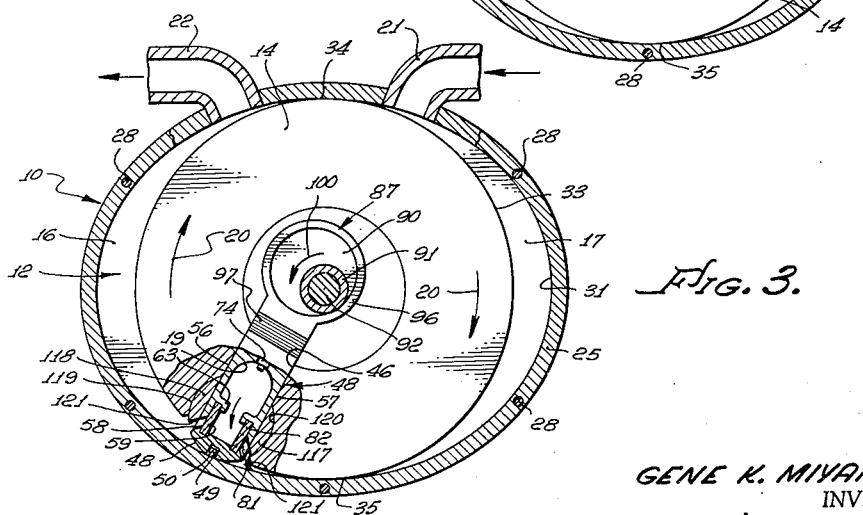
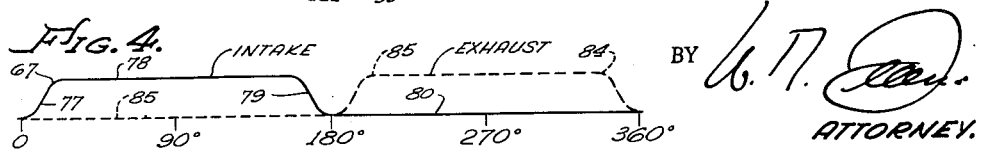

3,057,156
ROTARY INTERNAL COMBUSTION ENGINE
Gene K. Miyakawa, 4209 N. Cutler, Baldwin Park, Calif.
Filed June 21, 1961, Ser. No. 118,610
10 Claims. (Cl. 60—39.34)

This invention relates to internal combustion engines of the rotary type and more particularly to rotary engines which provide successive phases of suction, compression, power, and exhaust for each cycle of the rotary member.

Rotary engines are recognized as being more efficient than engines of the reciprocating type in that in a rotary engine the working or power impulse is directed tangentially of the moving member or rotor, whereas in a reciprocating engine the power impulse is directed axially in a cylinder against a piston which must periodically reverse its direction of movement and thereby expend much energy in overcoming its own inertia. Then too, in the case of a reciprocating engine driving a rotary shaft, the linear motion of the piston must be converted to rotary motion as with a crank shaft, whereas in a rotary engine the rotary motion of the rotor may be applied directly to the shaft.

A baffling and troublesome problem presents itself in the devising of a rotary internal combustion engine because of the requirement for closing one portion of the inside chamber or cavity of the engine from another portion so as to accommodate separate phases of fuel intake, compression, expansion, and exhaust. Some prior attempts have been made to solve this problem by providing radially reciprocating means for periodically closing and opening circumferential portions of a chamber in which the rotary member operates. Other investigators have turned to providing a plurality of casing and rotor units to accommodate the separate phases of translating the energy from an explosion into mechanical power. It is a general object of this invention to provide a rotary internal combustion engine which offers substantial improvements in construction and operation over rotary engines of this type which have been devised heretofore.

Viewed in its broader aspects, the present invention provides an internal combustion engine characterized by a partition or vane member which reciprocates radially in the rotor and in sliding abutment with the inside surface of the stator or casing of the engine so as to accommodate separate phases of fuel intake, combustion, expansion, and exhaust in each cycle. The vane member has a chamber formed therein for containing the fuel gases and for passing the gasses or burned gases, as the case may be, through successive phases in the operation of the engine.

Another object of this invention is to provide a rotary engine of the above-mentioned character which is rugged, relatively simple in construction, and reliable and efficient in operation.

In the following part of this description, the details of construction and mode of operation of a presently preferred embodiment of the invention are described with reference to the accompanying drawing, in which:

FIGURE 1 is a longitudinal central section through an engine of this invention;

FIGURE 2 is a cross-section through the engine taken along line 2—2 of FIGURE 1 and showing the parts of the engine in an instantaneous position just following the beginning of the simultaneously occurring fuel admission and fuel compression phases of the cycle of operation of the engine;

FIGURE 3 is a cross-section through the engine corresponding to that of FIGURE 2, but showing the engine parts in an instantaneous position just following the beginning of the simultaneously occurring power and exhaust phases of the cycle of operation of the engine;

FIGURE 4 is a graphical representation of the mode of operation of the engine; and, FIGURE 5 is a detail view showing portions of a slide valve of the engine, the view being taken on the plane for the sectional view of FIGURE 1 and being on a larger scale than FIGURE 1.

The drawing illustrates an engine of this invention as comprising a casing 10 having an internal cavity 12, a shaft 13 extending through the cavity, and a rotor 14 in the cavity and fixed on the shaft for imparting rotation to it. The rotor is circular in cross-section while the cavity is out-of-round or elliptical so as to provide two arched cavities 16 and 17 in casing cavity 12 extending circumferentially around the rotor. A partition or vane member 18 reciprocates radially in rotor 14 and is in continuous sliding abutment with the inside surface of the casing. The vane 18 is formed interiorly with a chamber 19 for containing the fuel and for passing the fuel and its explosion products from a compression phase to an expansion phase as will be explained. The illustrated engine has the casing 10 as its stationary member, and its rotor rotates in a clockwise direction, as viewed in FIGURES 2 and 3 of the drawing, i.e. in the direction of arrows 20. A conduit 21 provides for inlet of fuel to the casing cavity 12, and a conduit 22 provides for exhaust of burned fuel gases from the casing cavity.

Casing or stator 10 is formed of a circumferential wall 25 and two end walls 26 and 27 which are secured to the circumferential wall as with bolts 28. The inwardly facing surfaces of the end walls are designated by numerals 29 and 30, respectively, and the inside surface of the circumferential wall 25 is designated by numeral 31. These surfaces define the cavity 12 which in the illustrated embodiment is elliptical in cross-section with its interior dimension or minor axis equal to the diameter of the rotor 14. As a result, the circumferential peripheral surface 33 of the rotor is in sliding contact with the inside surface 31 of the stator, and more particularly, the surfaces 33 and 31 are tangent to each other along bearing portions 34 and 35. Inasmuch as the cavity 12 of the illustrated embodiment is elliptical in cross-section, it follows that the bearing portions 34 and 35 are relatively narrow and are diametrically opposed, with the rotor forming between itself and the casing, and in the cavity 12, the aforementioned portions 16 and 17 of equal size and shape between the bearing portions 34 and 35. Were the bearing portions 34 and 35, when viewed in cross-section, substantial arcs of a circle concentric with the rotor, a construction contemplated by this invention, the arched cavity portions 16 and 17 would not necessarily be of equal circumferential extent.

Another particularity of the illustrated embodiment is that the inside wall 31 of the stator is cylindrical and the rotor is also cylindrical, the rotor 14 being a right circular cylinder, its end surfaces 37 and 38 being in sliding abutment with the inside end surfaces 29 and 30, respectively of the stator.

The shaft 13 extends centrally into the casing 10, passing through central openings 40 and 41 in the stator end walls 26 and 27, and centrally through an axially extending bore 43 in rotor 14. The rotor is fixed coaxially on the shaft against rotation relative to the shaft by means of a key 44.

Rotor 14 is formed with a longitudinally extending radial slot 46 which intersects the rotor's circumferential surface 33 and its opposite end surfaces 37 and 38. The slot slidingly seats the partition or vane member 18 for radial reciprocation under radial forces received by its outer end 48 from the inside surface 31 of the stator 10 in which it slides as the rotor rotates. Inasmuch as the surface 31 in the illustrated embodiment is cylindrical, the outer end surface 48 of the partition 18 is straight in a direction longitudinally of the engine and is parallel to the axis of the shaft 13. Because the efficiency of the engine would be substantially decreased were the outer end surface 48 of the partition member not fluid-tight against the inside surface 31 of the casing, it is preferred to provide a seal as in the form of a bar 49 which becomes a part of the end surface 48 of the partition member. Seal bar 49 extends throughout the longitudinal extent of partition 18 in a groove 50 formed in the outer end of the partition, a thin corrugated spring 53 in the groove 50 underlying the bar and urging it outwardly against the inside surface 31 of the casing to assure a tight seal. It is to be noted that the centrifugal force imparted to the vane 18 during rotation of the rotor will also urge the seal bar against wall 31.

Viewing the partition on vane member 18 with reference to the directional arrows 20, or stated differently, with respect to the direction of rotation of rotor 14, the partition member may be said to have a forwardly facing wall, indicated at 56, and a rearwardly facing wall, indicated at 57. Near the outer end 48 of the partition member, its forwardly facing wall 56 is provided with a longitudinally extending series of inlet ports 58 for admission of fuel to the chamber 19. In the illustrated embodiment, opening and closing of these ports is controlled by a slide valve 59 in the form of flat gate having a longitudinally extending series of apertures 61 equal in number to the ports 58, and separated from each other by port-closure lands 62. The gate is held slidable against the inside of the forwardly facing wall 56 by means of a lip 63 which extends inwardly of the combustion chamber and over an edge of the valve gate.

The slide valve 59 functions to open the inlet ports 58 during that phase in the rotation of the rotor in which the partition 18 is directed into the ellipticity portion 17 of the stator cavity (right hand portion as viewed in FIGURES 2 and 3.), and the valve closes the inlet ports when the partition member is directed into the antipodal ellipticity portion 16. This is effected in the illustrated embodiment by a cam follower arm 64 at one end of and integral with the slide valve gate 59 which extends radially inward from the valve with respect to the rotor. The cam follower arm has a cam follower wheel 65 in position to roll along a cam surface 67 of an annular cam 68 on the casing end wall 27. Cam 68 is spaced radially outward of and surrounds the axial opening 41 in the casing end wall 27. The cam follower 65 is maintained in uninterrupted engagement with the cam surface 67 during rotation of rotor 14, a spring 70 bearing at one of its ends against the follower arm 64 and at its other end against a shoulder 71 in the rotor.

Viewing the annular cam 68 in a direction perpendicular to the inside surface 30 of the casing end wall 27, the cam corresponds in configuration to the cross-sectional configuration of the inside surface 31 of the stator, the major axis of the elliptical cam 68 being coincident with the major axis of the elliptical casing 31. Thus as the partition member 18 reciprocates radially in the rotor with its outside surface 48 in engagement with the inside surface 31 of the stator, the cam follower 65 will trace an elliptical path and will at all times ride on the annular cam 68.

Longitudinal movement of the slide valve 59 against the force of its spring 70 is effected by the cam 68 extending longitudinally inward with respect to the casing end wall 27 to a greater extent throughout one-half the period of rotation of the rotor than for its other half. As the rotor rotates in the direction of arrows 20 and the vane 18 moves past the bearing surface 34, being urged radially outwardly and in uninterrupted sliding engagement with the inside surface 31 of the stator, fuel contained in the ellipticity 17 (present because of the next preceding rotation of the rotor) will be forced into the vane chamber 19 through the inlet ports 58 and compressed. During this same phase in the cycle of the engine, fuel will be drawn through the fuel intake conduit 21 into that portion of the ellipticity 17 which develops rearwardly of the moving partition member, to provide a charge of fuel for explosion during the next succeeding cycle of the engine. When the rotor has reached that phase of its rotation wherein the partition member 18 is directed vertically downward, as viewed in the attitude of FIGURES 2 and 3, and is in contact with the bearing surface portion 35, all the fuel which was present in that portion of the ellipticity 17 forwardly of the partition member will have been swept into the combustion chamber 19. It is at or near this phase of the rotation of the rotor that the fuel within the combustion chamber 19 is ignited, as by a spark plug 74, in the combustion chamber which is energized through leads 75 extended axially through the shaft 13 and to an electrical power source (not shown).

Throughout the intake and compression phases in the operation of the engine, the inlet ports 58 are open, i.e., the apertures 61 of the slide valve 59 are aligned with their respective inlet ports 58. As the rotor continues past that phase of its rotation in which partition member 18 is directed vertically downward as viewed in the attitude of FIGURES 2 and 3, i.e., in alignment with the bearing surface 35, and following ignition of the fuel in combustion chamber 19, the slide valve 59 closes the inlet ports 58 and the partition member begins its travel through the power phase and exhaust phase of the engine cycle.

The cam 68 has functioned with the cam follower 65 to maintain the inlet ports 58 open throughout the intake and compression phases of the engine cycle. It is so shaped as to allow the valve spring 70 to move the valve gate in a direction to close the inlet ports 58 throughout the power and exhaust phases. To this end the annular cam 68 extends to a greater distance perpendicularly inward from the casing end wall 27 throughout one-half portion thereof than throughout its other half portion. A preferred configuration for the cam surface 67 may be explained with reference to FIGURE 4 of the drawing. The zero point at the extreme left hand end of FIGURE 4 represents that position of the partition member in which it is directed vertically upward and in alignment with the bearing surface 34. At that point the cam surface begins to extend inwardly into the stator cavity and from the end wall 27, as indicated by inclined cam surface 77 on the solid line curve of FIGURE 4. Surface 77 merges with an extended flat surface 78. When the partition member 18 approaches the bearing surface portion 35, marking the close of the compression phase, the cam surface 67 recedes axially outwardly with respect to the rotor, as illustrated in FIGURE 4 by the inclined surface 79, to effect movement of the slide valve 59 in a direction to the right in FIGURE 1 for closing the inlet ports 58. The cam surface 67 then continues as a receded surface 80 extending throughout that phase in the period of rotation of the motor from the 180° mark to the 360° or 0° position so that the inlet ports 58 remain closed under the urging of spring 70, throughout the power and exhaust phases of the engine cycle.

Referring now to the rearwardly facing wall 57 of the partition member 18, it has, in the manner of forward wall 56, a longitudinally extending series of exhaust ports 81 formed therein. These exhaust ports are controlled by a slide valve 82 similar in construction and mode of operation to the slide valve 59 and operatively associated with an elliptical cam 84 corresponding to the cam 68 previously described. The slide valve 82 controls the opening and closing of exhaust ports 81 and its structure and mode of operation is like that of the corresponding elements for controlling the inlet ports 58, the sole difference being that the valve 82 is substantially 180° out of phase with respect to the slide valve 59. Thus in FIGURE 4 the cam 84 is represented by the broken line curve 85 as being contoured to maintain the slide valve 82 in position to close the exhaust ports 81 throughout the intake and compression phases of the engine cycle, and to maintain these exhaust ports open throughout the power and exhaust phases of the engine cycle. As the partition member travels past the 180° position thereof (FIGURE 3), in which it is aligned with the bearing surface portion 34, the exhaust ports are open (the inlet ports 58 being closed) so that the exploding gases in the combustion chamber 19 expand outwardly behind the partition member to drive the partition member in a power or working phase in the direction of rotation indicated by arrows 20. In the part of the ellipticity portion 16 of the stator chamber 12 forward of the vane 18 as viewed in FIGURE 3, the exhaust or burned gases remaining in this ellipticity portion from the power phase of the immediately preceding cycle, are swept out by the moving vane out through the exhaust outlet 22.

It is to be understood, of course, that the illustrated engine is furnished with a suitable fly wheel (not shown) mounted on the shaft 13 for maintaining uninterrupted rotation. Also, of course, it is apparent that a plurality of partition members, e.g. two or three, may be positioned in the rotor to provide a plurality of successive power strokes with each rotation of the rotor.

The mode of operation of the illustrated engine has been described above according to a concept of this invention in which the partition vane 18 is caused to reciprocate radially in the rotor under the influence of centrifugal force which urges the vane 18 radially outward, and in which the configuration of the inside surface of the stator in the 90° to 180° and the 270° to 360° segments provides an inwardly directed force to displace the vane inwardly to complete the period or cycle of reciprocation. However, this invention is not limited to engines having stator cavities of elliptical cross-section and in the drawings is shown additional means for positively retracting the vane upon which sole reliance would be placed in cases in which enclosing surfaces of the arcuate cavity portions 16 and 17 were not suitable. The illustrated means for positively withdrawing or retracting the partition member comprises an eccentric, designated generally by reference numeral 87, which includes a cam wheel 90 having a sleeve bearing 91 through the bore 92 of which extends the shaft 13. As best appears in FIGURES 2 and 3, the bore 92 is eccentrically positioned with respect to the center of the cam wheel 90. The cam wheel is rotatable about the shaft 13 and is also rotatably mounted by its sleeve bearing 91 in the axial opening 40 of the casing end wall 27. Operating with the cam wheel 90 is a cam follower 96 in the form of a strap or ring which circumscribes the cam wheel and is connected to the partition member through an arm 97.

The partition member 18 completes two cycles of radial reciprocation during each cycle comprising 360° of rotation of the rotor. To this end cam wheel 90 is caused to rotate in the direction of arrow 100 to make or effect one complete revolution while rotor 14 executes one complete revolution in the direction of arrows 20. The rotation of cam wheel 90 is effected through a series or train of spaced-apart bevel gears 102 and 103 and an intermediate or pinion gear 104. The latter is rotatably supported on a spindle 105 carried by a projection 106 from the casing end wall 27. The bevel gear 102 is fixed nonrotatably on the shaft 13 as by a key 107, and the bevel gear 103 is keyed at 108 to the sleeve portion 91 of the cam wheel. As the shaft 13 is rotated in the direction of arrows 20, the pinion gear 104, being at right angles to each of the gears 102 and 103, will cause the gear 103 and the cam wheel 90 to which it is keyed to rotate in a direction opposite to that of the gear 102 and in the direction of arrow 100.

End wall 26 of the engine is equipped with an eccentric 110 similar in construction and mode of operation to the eccentric 87 just described to provide both ends of the partition member with positive retracting means, the eccentric 110 being similar in all respects thereof to the eccentric 87 and being actuated by counterparts of the gear train 102, 103 and 104, described above in detail.

In cases in which a positive retraction means of the illustrated eccentric type is employed, the eccentricity motion will, of course, include a moment about the eccentric cam wheel 90 in a direction perpendicular to the radii of the rotor. Such sidewise moment, as in a crank, may be resolved in various ways as with a pivoted and telescoping rod between the partition member and the cam surface 94, but in the illustrated embodiment this resolution of the cranking motion of the partition retracting means is accomplished by allowing the partition member to change its inclination with respect to the radii of the rotor. Changes in the inclination of the partition member 18 are accommodated by pivotally and slidably mounting it between the bearings 117 and 118 the circular outer surfaces 119 of which seat in mating seats 120 formed in the side walls 113 and 114 of the partition receiving slot 46. The walls 113 and 114 inwardly of the seats 120 flare or diverge outwardly sufficiently to permit the partition to tilt without limitation.

It will be apparent that the bearings 117 and 118 allow the partition member to reciprocate or slide therebetween and provide a pivot which accommodates inclination of the partition member with respect to the radii of the rotor as the partition member travels through a cycle of its reciprocation. It is to be noted further that the bearing elements 117 and 118 are beveled at their outermost surfaces 121, and that the rim portions 122 of the rotor which define the outer end of the slot 46 are likewise beveled to allow for flow of fuel from the chambers 16 and 17 in the stator to the inlet and exhaust ports of the partition chamber 19.

The operation of the engine has been described with reference to FIGURE 4 of the drawing wherein the inlet ports of the chamber 19 are opened immediately following passage of the partition member 18 beyond alignment with the bearing surface 34 and closed instantaneously before its alignment with the bearing surface 35. However, it is to be understood that the valve controlling cams 68 and 84 may be altered in configuration so as to advance or retard these valve operating positions as optimum operating conditions for the engine will dictate.

While the particular rotary internal combustion engine herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. An internal combustion engine comprising a casing having an inside circumferential surface, an inner member in the casing of circular cross-section, the casing enclosing the circumferential surface of said member in fluid tight relationship and providing two arcuate spaces around said member, said spaces extending circumferentially of said member and being separated from each other at two bearing regions in which the circumferential surface of said member is in sliding engagement with the inside circumferential surface of the casing, said member being relatively rotatable in the casing, a partition reciprocably slidable in said member, means for urging the partition radially outward and maintaining the outer end surface of the partition in sliding engagement with the inside circumferential surface of the casing throughout the cycle of relative rotation of the inner member in the casing, the partition having a chamber formed therein and having a fuel inlet port and a gas outlet port through which the chamber is open to the inside of the casing, means for opening said inlet port and for closing said outlet port during that phase in the cycle of relative rotation of said member in which said partition extends into one of said arcuate spaces and for closing said inlet port and opening said outlet port in the partition extends into the other of said arcuate spaces, a conduit open in said casing for admitting fuel to said one arcuate space, and a second conduit open in said casing for exhausting gases from said other arcuate space.

2. An internal combustion engine comprising a shaft, a rotor of circular cross-section fixed co-axially on the shaft, a stator enclosing the circumferential surface of the rotor in fluid tight relationship and providing two arcuate spaces around said rotor, said spaces extending circumferentially of the rotor and being separated from each other at two circumferentially spaced-apart bearing regions in which the circumferential surface of the rotor is in sliding engagement with stator, the rotor having a radially extending slot formed therein, the slot intersecting the circumferential surface of the rotor, a partition reciprocably slidable in the slot radially of the rotor and in sliding engagement with the inside circumferential surface of the stator throughout the cycle of rotation of the rotor, the partition having a chamber formed therein and having a fuel inlet port and a gas outlet port through which the chamber is open to said spaces, means for opening said inlet port and for closing said outlet port when the partition extends into one of said arcuate spaces and for closing said inlet port and for opening said outlet port when the partition extends into the other of said arcuate spaces, a conduit for admitting fuel to said one arcuate space, and a second conduit for exhausting gases from said other arcuate space.

3. An internal combustion engine comprising a shaft, a rotor of circular cross-section fixed co-axially on the shaft, a stator enclosing the circumferential surface of the rotor in fluid-tight relationship and providing two arcuate spaces around said rotor, said spaces extending circumferentially of the rotor and being separated from each other by two circumferentially spaced apart bearing regions in which the circumferential surface of the rotor is in sliding engagement with stator, the rotor and shaft being rotatable as a unit in the stator with the shaft extending therefrom, the rotor having a radially extending slot formed intersecting its circumferential surface, a partition reciprocably slidable in the slot radially of the rotor and in sliding engagement with the inside circumferential surface of the stator throughout the cycle of rotation of the rotor, the partition having a chamber formed therein and having a forward side wall and a rearward side wall, said forward wall having a fuel inlet port opening into said chamber, said rearward wall having a gas outlet port for exhaust from said chamber, said ports being located proximate the outer end of the partition and positioned radially beyond said rotor and so exposed during those phases in the cycle of the rotor in which the partition extends into said arcuate spaces, means for opening said inlet port and closing said outlet port when the partition extends into one of said arcuate spaces and for closing said inlet port and opening said outlet port when the partition extends into the other of said arcuate spaces, a conduit for admitting fuel to said one arcuate space, and a second conduit for exhausting gases from said other arcuate space.

4. An internal combustion engine comprising a casing, a shaft extending into the casing, an inner member in the casing of circular cross-section and fixed co-axially on the shaft, the casing enclosing the circumferential surface of said member in fluid-tight relationship and providing two arcuate spaces around said member, said spaces extending circumferentially of said member and being separated from each other by two bearing regions in which the circumferential surface of said member is in sliding engagement with the inside circumferential surface of the casing, said member and shaft being rotatable as a unit in the casing, a partition reciprocably slidable in said member, means for urging the partition radially outward and maintaining the outer end surface of the partition in sliding engagement with the inside circumferential surface of the casing throughout the cycle of relative rotation of the inner member in the casing, the partition having a chamber formed therein and having a forward side wall and a rearward side wall, said forward wall having a fuel inlet port for inlet to said chamber, said rearward wall having an outlet port for exhaust from said chamber, means for opening said inlet port and for closing said outlet port during that phase in the cycle of relative rotation of said member in which said partition extends into one of said arcuate spaces and for closing said inlet port and opening said outlet port during that phase in which the partition extends into the other of said arcuate spaces, a conduit open in said casing for admitting fuel to said one arcuate space, and a second conduit open in said casing for exhausting gases from said other arcuate space.

5. An internal combustion engine comprising a stator having an internal cavity of elliptical cross-section, a rotatable shaft extending axially into the cavity, a rotor of circular cross-section, in the cavity and fixed coaxially on the shaft, the circumferential surface of the rotor being in sliding engagement with the inside circumferential surface of the stator along two circumferentially spaced-apart bearing surfaces which define the ends of two opposite arcuate cavity portions separated from each other by the rotor in the cavity, said bearing surfaces closing said arcuate portions against free passage of gas from one of said portions to the other, the rotor having a radially extending slot formed therein open to its circumferential surface, a partition reciprocatingly slidable in the slot radially of the rotor from and between an innermost retracted position in which the partition does not extend outwardly beyond the circumferential surface of the rotor and an outermost protruded position in which the partition extends outwardly beyond the circumferential surface of the rotor, the outer end surface of said partition being in sliding engagement with the inside surface of the stator throughout rotation of the partition in said arcuate cavity portions, the partition having a chamber formed therein and having a forward side wall facing in the direction of the rotation of the rotor and a rearward side wall facing in a direction opposite to the direction of the rotation of the rotor, each of said partition side walls having a port adapted to provide fluid flow communication from said chamber to said arcuate cavity portions when the partition member extends into said arcuate cavity portions, a fluid inlet conduit for admitting fuel to one of said arcuate portions proximate one end thereof, an exhaust conduit for outlet of exhaust from the other arcuate cavity portion proximate said inlet conduit, and means for opening the inlet port when the partition extends into the first-mentioned arcuate cavity portion and for closing said inlet port when the partition extends into said other arcuate cavity portion and means for opening and closing said exhaust port in substantially 180° out-of-phase relationship to the opening and closing of said inlet port.

6. An internal combustion engine comprising a stator having an internal cavity, said cavity being a right cylinder of elliptical cross-section, a shaft extending axially through the stator and being rotatable on its longitudinal axis, a rotor in said cavity and fixed coaxially on said shaft against relative rotation of the shaft and the rotor, the rotor being of right circular cylindrical configuration and being coextensive in axial extent with said cavity and equal in diameter to the minor axis of said elliptical cross-section, said rotor being in slidable engagement with the inside surfaces of said stator which define said cavity to provide two diametrically opposed bearing surface portions extending longitudinally of the cavity and defining two diametrically opposed ellipticity portions of said cavity separated from each other by said rotor, the rotor having inside surfaces defining a radially and longitudinally extending slot open in the cylindrical surface of the rotor, a partition reciprocatingly slidable in the slot and movable in a direction radially of the rotor from and between a retracted position in which the partition does not extend outwardly beyond the side of the cylindrical surface of the rotor and an outermost protruded position in which the partition extends outwardly beyond the cylindrical surface of the rotor when the partition is aligned radially with a midpoint of an ellipticity portion of said chamber, the partition having a chamber formed therein and having a forward side wall facing in the direction of the rotation of the rotor and a rearward side wall facing in a direction opposite to the direction of the rotation of the rotor, each of said partition side walls having a port providing fluid flow communication from said chamber to said arcuate cavity portions when the partition member extends into said arcuate cavity portions respectively, a fluid inlet conduit for admitting fuel to one of said arcuate portions proximate one end thereof, an exhaust conduit for outlet of exhaust from the other arcuate cavity portion proximate said inlet conduit, and means for controlling said inlet and outlet ports to open the inlet port when the partition extends into the first-mentioned arcuate cavity portion and to close said inlet port when the partition extends into said other arcuate cavity portion, and to open and close said exhaust port in substantially 180° out-of-phase relationship to the opening and closing of said inlet port.

7. An internal combustion engine comprising a stator having internal surfaces defining an interior cavity, said surfaces being two opposed facing end surfaces and circumferentially continuous side surface, the stator having a longitudinal axis extending centrally of and through said end surfaces, said side surface being smooth throughout the circumferential extent thereof and being out-of-round when viewed in section perpendicular to the stator axis and forming two ellipticity portions of the cavity, said ellipticity portions being separated by two longitudinally extending bearing portions of said side surface, said bearing portions being spaced-part circumferentially of the side surface and being of common configuration in axial section and being of corresponding dimensions from the stator axis, a shaft extending coaxially through the stator and being rotatable on its longitudinal axis, a rotor in said cavity and fixed coaxially on the shaft against relative rotation of the shaft and rotor, the rotor being of circular cross-section and having two end surfaces in slidable contact with the stator internal end surfaces respectively, the rotor having circumferentially continuous side surface of circular cross-section corresponding in axial section to the configuration of said bearing surfaces of the stator and being in sliding engagement with said bearing surface portions, thereby to close said ellipticity portions against free passage of gas from one ellipticity portion to the other between the rotor and said bearing surface portions, the rotor having inside surfaces defining a slot open in the side surface of the rotor, a partition reciprocably slidable in the slot in a direction radially of the rotor from and between a retracted position in which the partition does not extend outward beyond the side surface of the rotor and a protruded position in which the partition extends outwardly beyond the side surface of the rotor, the partition having an outer end surface mating with and being of equal axial extent with the internal side surface of the stator, means for urging the partition radially outward of the slot to maintain its outer end surface slidably engaged with the interior side surface of the stator, the piston having a longitudinal dimension measured axially of the rotor equal to the corresponding axial dimension of the stator internal side surface whereby when the rotor is in that phase of its period of rotation in which the partition is radially aligned with a bearing surface, the partition will be in its retracted position and when the rotor is in any phase of its period of rotation in which the partition is exposed to either of said ellipticity portions the partition will protrude outwardly into sliding engagement with the stator internal side surface thereby to divide ellipticity portion into fore and aft portions with the partition closing said fore and aft portions against free passage of gas from one of said fore and aft portions to the other between the partition and the internal side surface of the stator, said fore portion of one of said ellipticity portions being a compression chamber portion, said aft portion of said one ellipticity portion being a suction portion or fuel admission portion, said aft portion of the other ellipticity portion being a power or work or expansion portion, and said fore portion of said other ellipticity portion being a gas exhaust portion or chamber, the partition having inside surfaces defining an internal chamber, the partition having a forward side wall thereof facing in the direction of rotation of the rotor and a rearward side wall thereof facing in a direction opposite to that of the direction of rotation of the rotor, said forward wall having fuel inlet ports formed therein for admitting gas from said compression chamber into the partition chamber, said rearward side wall having gas exhaust ports formed therein for exhaust of burned gases from the said partition chamber to said expansion chamber, valve means operatively associated with said ports and with said stator for opening said inlet port when the piston is moving in said one ellipticity portion and for controlling said exhaust port to permit a flow of burned fuel gases from the partition chamber to said power chamber, a conduit connected to the stator for admitting fuel to said admission chamber, and a second conduit connected to the stator for exhausting gases from said exhaust chamber.

8. An internal combustion engine according to claim 7 in which said stator internal side surface is cylindrical and elliptical in cross-section, said bearing surfaces are diametrically opposed along the minor axis of said elliptical configuration, and said rotor is cylindrical and tangent to the internal cylindrical surface of the stator at said bearing surface portions.

9. An internal combustion engine according to claim 7 in which said partition urging means comprises an eccentric comprising a sheave having a circumferentially extending cam surface, a cam follower engaged with said cam surface and mounted on said partition, and means for maintaining the cam follower in engagement with said cam surface.

10. An internal combustion engine according to claim 7 in which said port control means comprises slide valves respectively, each slide valve having a cam follower, each end wall of the stator having a cam surface spaced radially outward from and extending circumferentially around the shaft, and means for urging the valve cam followers in engagement with their valve cam surfaces, the valve cam surfaces being shaped to urge their respective slide valves in directions longitudinally of the rotor.

References Cited in the file of this patent

UNITED STATES PATENTS 1,637,958    Newson    Aug. 2, 1927
2,516,051    Faitout    July 18, 1950